United States Patent
Krall et al.

(10) Patent No.: US 8,533,581 B2
(45) Date of Patent: Sep. 10, 2013

(54) OPTIMIZING SECURITY SEALS ON WEB PAGES

(75) Inventors: Gary Krall, Saratoga, CA (US); Barry Ferg, North Vancouver (CA); David M'Raihi, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 335 days.

(21) Appl. No.: 12/779,408

(22) Filed: May 13, 2010

(65) Prior Publication Data
US 2011/0283174 A1 Nov. 17, 2011

(51) Int. Cl.
*G06F 17/00* (2006.01)
*G06F 17/20* (2006.01)

(52) U.S. Cl.
USPC ........................................ 715/205; 705/14.41

(58) Field of Classification Search
USPC .......................................................... 715/205
See application file for complete search history.

(56) References Cited

U.S. PATENT DOCUMENTS

| | | | |
|---|---|---|---|
| 7,092,912 B2* | 8/2006 | Khaishgi et al. | 705/58 |
| 7,698,442 B1* | 4/2010 | Krishnamurthy et al. | 709/229 |
| 8,234,632 B1* | 7/2012 | Hugeback et al. | 717/130 |
| 2005/0065806 A1* | 3/2005 | Harik | 705/1 |
| 2005/0160286 A1* | 7/2005 | Currie et al. | 713/200 |
| 2006/0015722 A1* | 1/2006 | Rowan et al. | 713/166 |
| 2007/0283291 A1* | 12/2007 | Morris | 715/804 |
| 2009/0003588 A1* | 1/2009 | Ross | 380/28 |
| 2010/0030894 A1* | 2/2010 | Cancel et al. | 709/224 |

* cited by examiner

*Primary Examiner* — James DeBrow
(74) *Attorney, Agent, or Firm* — Lowenstein Sandler LLP

(57) ABSTRACT

A method of providing web site verification information to a user can include receiving a DNS query including a host name and a seal verification site name, parsing the DNS query, and extracting the host name from the DNS query. The method also can include accessing a DNS zone file including a list of Trust Services customers and determining if the host name is associated with a Trust Services customer in the list of Trust Services customers. The method further can include transmitting a positive identifier to the requester if the host name is associated with a Trust Services customer and transmitting a negative identifier to the requester if the host name is not associated with a Trust Services customer. In a specific embodiment, the Trust Services include issuance of digital certificates.

12 Claims, 7 Drawing Sheets

```
C:\WINDOWS\system32\command.com

Microsoft(R) Windows DOS
(C)Copyright Microsoft Corp 1990-2001.

H:\>nslookup www.schwab.com.seal.verisignlabs.com
Server:  padc03.ttc.local
Address:  10.2.31.113

Non-authoritative answer:
Name:    www.schwab.com.seal.verisignlabs.com
Address:  127.0.0.1

H:\>nslookup www.ally.com.seal.verisignlabs.com
Server:  padc03.ttc.local
Address:  10.2.31.113

Non-authoritative answer:
Name:    www.ally.com.seal.verisignlabs.com
Address:  67.215.65.132

OPTIMIZING SECURITY SEALS ON WEB PAGES

BACKGROUND OF THE INVENTION

Security seals are used as a sign of trust on the Internet. As an example, the VeriSign Secured® Seal is a leading sign of trust on the Internet. Widely recognized, the VeriSign Secured® Seal appears on web pages secured by VeriSign SSL Certificates as a dynamic, animated graphic or in a static version. SSL certificates are also referred to as digital certificates or certificates. After a browser loads a web page, the user is able to click on the seal to verify the web site's information in real time.

Despite the benefits provided by existing security seals, there is a need in the art for improved methods and systems for providing security seals.

SUMMARY OF THE INVENTION

The present invention relates generally to computer networks. More specifically, the present invention relates to methods and systems for providing security seals on web pages. Merely by way of example, the invention has been applied to a method and system for verifying web sites and providing verification information to Internet users. In a particular embodiment, web sites found in a search are displayed along with a graphic representing an existing verification provided by a security seal vendor. As an example, a security seal could be displayed adjacent or next to a web site link resulting from a search, indicating that the web site, for instance, is malware free, has been scanned for vulnerabilities and/or has an SSL certificate. We will call the different services available to any given customer (e.g., malware scanning, vulnerability scanning, SSL certificate, and the like) Trust Services in the following sections of this document. The methods and techniques can be applied to a variety of computer networks and communications systems.

According to an embodiment of the present invention, a method of providing web site verification information to a user is provided. The method can include receiving a DNS query including a host name and a seal verification site name, parsing the DNS query, and extracting the host name from the DNS query. The method also can include accessing a DNS zone file including a list of Trust Services customers and determining if the host name is associated with a Trust Services customer in the list of Trust Services customers. The method further can include transmitting a positive identifier to the requester if the host name is associated with a Trust Services customer and transmitting a negative identifier to the requester if the host name is not associated with a Trust Services customer. As an example, a certificate customer is a Trust Services customer in a particular embodiment.

According to another embodiment of the present invention, a method of displaying a security seal in a web browser is provided. The method can include transmitting a search request to a search engine and receiving a search result from the search engine. The search result can include at least one host name. The method also can include transmitting a DNS query to a seal verification server. The DNS query can include the at least one host name. The method further can include receiving seal information associated with the at least one host name from the seal verification site, displaying the search result including the at least one host name, and displaying the security seal in association with the at least one host name.

According to a specific embodiment of the present invention, a system for providing web site verification information to a user is provided. The system can include a data processor, a communications module coupled to the data processor, and a computer readable medium coupled to the data processor and storing a plurality of instructions for controlling the data processor to provide the web site verification information to the user. The plurality of instructions include instructions that cause the data processor to receive a DNS query including a host name and a seal verification site name, instructions that cause the data processor to parse the DNS query, and instructions that cause the data processor to extract the host name from the DNS query. The plurality of instructions also include instructions that cause the data processor to access a DNS zone file including a list of Trust Services customers and instructions that cause the data processor to determine if the host name is associated with a Trust Services customer in the list of Trust Services customers. The plurality of instructions further include instructions that cause the data processor to transmit a positive identifier to the requester if the host name is associated with a Trust Services customer and instructions that cause the data processor to transmit a negative identifier to the requester if the host name is not associated with a Trust Services customer. As an example, a certificate customer is a Trust Services customer in a particular embodiment.

According to another specific embodiment of the present invention, a system for displaying a security seal in a web browser is provided. The system can include a data processor, a communications module coupled to the data processor, and a computer readable medium coupled to the data processor and storing a plurality of instructions for controlling the data processor to display the security seal in the web browser. The plurality of instructions include instructions that cause the data processor to transmit a search request to a search engine and instructions that cause the data processor to receive a search result from the search engine. The search result can include at least one host name. The plurality of instructions also include instructions that cause the data processor to transmit a DNS query to a seal verification server. The DNS query can include the at least one host name. The plurality of instructions further include instructions that cause the data processor to receive seal information associated with the at least one host name from the seal verification site, instructions that cause the data processor to display the search result including the at least one host name, and instructions that cause the data processor to display the security seal in association with the at least one host name.

According to another embodiment of the present invention, a method for displaying security information in search results is provided. The method can include transmitting a request to a search engine and receiving a response from the search engine. The response can include a host name. The method also can include transmitting a request to a Trust Services provider. As an example, the Trust Services provider could be a certificate authority providing digital certificates. The request can include the host name. The method further can include receiving a response from the Trust Services provider, determining that the host name is associated with a customer of the Trust Services provider, displaying the host name in search results, and displaying a security seal adjacent to the host name in the search results. The request can be transmitted in accordance with several protocols, including DNS, DNSSEC, HTTP and HTTPS. The response can include not only a positive or negative indication related to the customer status of the host name, but additional information including the class or type of Trust Services, for example, the class or type of a certificate. For different classes and types of Trust Services, different security seals can be displayed. Trust services purchased by the customers can include digital certificates, malware detection, security vulnerability analysis, and the like.

Numerous benefits are achieved by way of the present invention over conventional techniques. For example, embodiments of the present invention provide Internet users with an increased level of trust in web sites returned in a search. Utilizing a DNS query to access information on Trust Services (e.g., SSL certificate issuance), embodiments of the present invention provide a rapid response using widely available DNS resolution systems that are both efficient and scalable. Using high reliability DNS servers and subdomains, web site status (e.g., if a web site has been scanned and is malware free, has an SSL certificate, or the like is) verified using existing resources, reducing maintenance costs. As described more fully throughout the present specification, when a user running a search sees security seals displayed next to selected web site links in the search results, the user knows that these web sites are secure and will be more likely to click on the links to these secure web sites, increasing the traffic to these sites and demonstrating the value of a site investing in security to protect his present and future users. Embodiments of the present invention offer a high level of granularity to transform a set of data into a visual representation easy to understand for consumers. The seal image displayed next to a search result is the compilation of a rich data set, including security scanning, type of security used by a web site, possibly privacy information, or the like, into a single visual representation. These and other embodiments of the invention along with many of its advantages and features are described in more detail in conjunction with the text below and attached figures.

BRIEF DESCRIPTION OF THE DRAWINGS

FIG. 5 is a screenshot of DNS look-ups performed using a command line tool according to an embodiment of the present invention.

DETAILED DESCRIPTION OF SPECIFIC EMBODIMENTS

Figure 1:
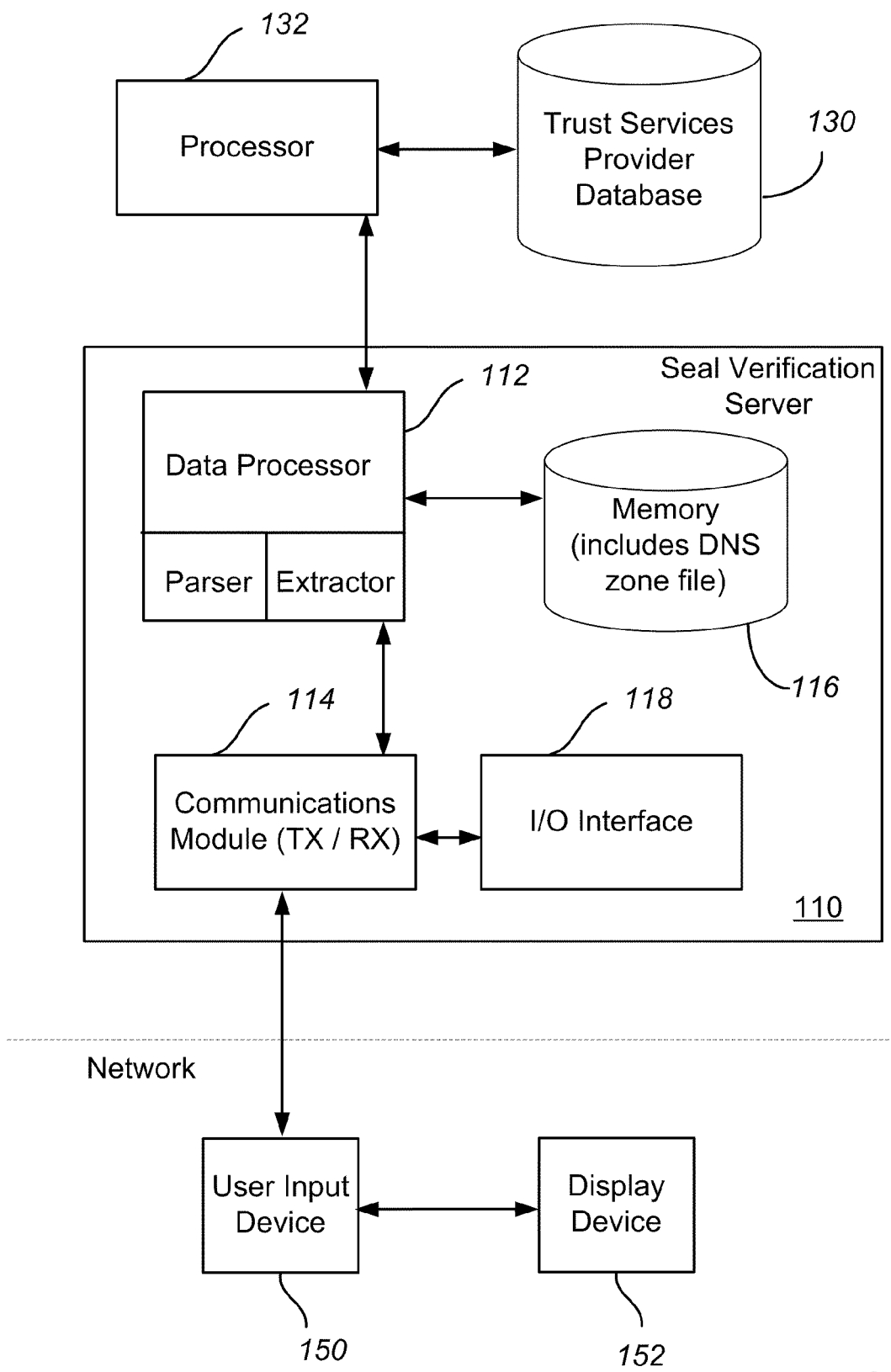
FIG. 1 is a simplified schematic diagram of a system for providing security seals for search results according to an embodiment of the present invention.

FIG. 1 is a simplified schematic diagram of a system for providing security seals for search results according to an embodiment of the present invention. The system, which may be part of a larger Trust Services (e.g., certificate) management system, can include a processor 132 and a Trust Services provider database 130. The customer list for the Trust Services provider is stored in Trust Services provider database 130. Processor 132 is able to retrieve the customer list and provide the customer list to data processor 112, which then stores the customer list in memory 116 as a DNS zone file. Thus, the DNS zone file is updated on a regular basis as appropriate to the particular implementation. It will be appreciated that data in addition to the customer list is stored by the Trust Services provider in Trust Services provider database 130, for example, data utilized to perform additional DNS functions. In order to protect the identity of some customers, a filtering process could be performed when creating the DNS zone file from the full customer list. Thus, the DNS zone file could be a filtered list of customers, only revealing the names of customers that have consented to having their identity as a customer revealed.

The seal verification server 110 can include data processor 112, also referred to as a processor, and memory 116. As described more fully in relation to FIG. 2 below, the data processor 112 will receive DNS queries from communications module 114, which is able to both transmit and receive data and messages, parse the DNS query, extract a host name from the DNS query, access memory 116, and compare the host name against the DNS zone file to determine if the host name is associated with a customer of the Trust Services provider. The parser and the extractor are highlighted in the schematic diagram, but other functionality can be included in the processor 112 including memory access and a comparator.

Processor 132 and data processor 112 can be general purpose microprocessors configured to execute instructions and data, such as Pentium processors manufactured by the Intel Corporation of Santa Clara, Calif. They can also be Application Specific Integrated Circuit (ASIC) devices that embody at least part of the instructions for performing the method in accordance with the present invention in software, firmware and/or hardware. As an example, such processors include dedicated circuitry, ASICs, combinatorial logic, other programmable processors, combinations thereof, and the like. The memory (also referred to as a database or a computer readable medium) 612 can be local or distributed as appropriate to the particular application. The Trust Services provider database 130 and memory 116 can store information related to the certificates issued by the CA, information related to malware detection and/or security vulnerability analysis, program code and instructions executed by the processors 132 and 112, and other suitable data. In an exemplary embodiment, memory 116 stores the DNS zone file used in implementing the method described herein.

Memory 116 may include a number of memories including a main random access memory (RAM) for storage of instructions and data during program execution and a read only memory (ROM) in which fixed instructions are stored. Thus, memory 116 can provide persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The seal verification server 110 also can include communications module 114 and I/O interface 118 in one embodiment. The I/O interface enables a system operator to interact directly with the seal verification server 110. The I/O interface is optional in other embodiments. The communications module 114 can include a receiver and a transmitter as illustrated by the RX/TX text in FIG. 1. The receiver and transmitter are operable to interact with a user input device 150 and a display device 152 over a network. The network can be the Internet or other network suitable for the communication of data and commands. Thus, a user is able, through a user interface interacting with the user input device 150 and the display device 152 to submit information including host names in order to perform the methods described herein. The user input device 150 and display device 152 will typically be contained in computing device including an additional processor. As an example, the user input device and display device can be components of a computer (e.g., a laptop, a desktop, a PDA, a tablet computer, a notebook, a mobile phone, or the like) or a web application that the user is operating to perform searches. One of ordinary skill in the art would recognize many variations, modifications, and alternatives. Typically, the user will interact with the seal verification server 110 using one or more (GUIs) receiving input through user input device 650 and displaying output through display device 652.

Figure 2:
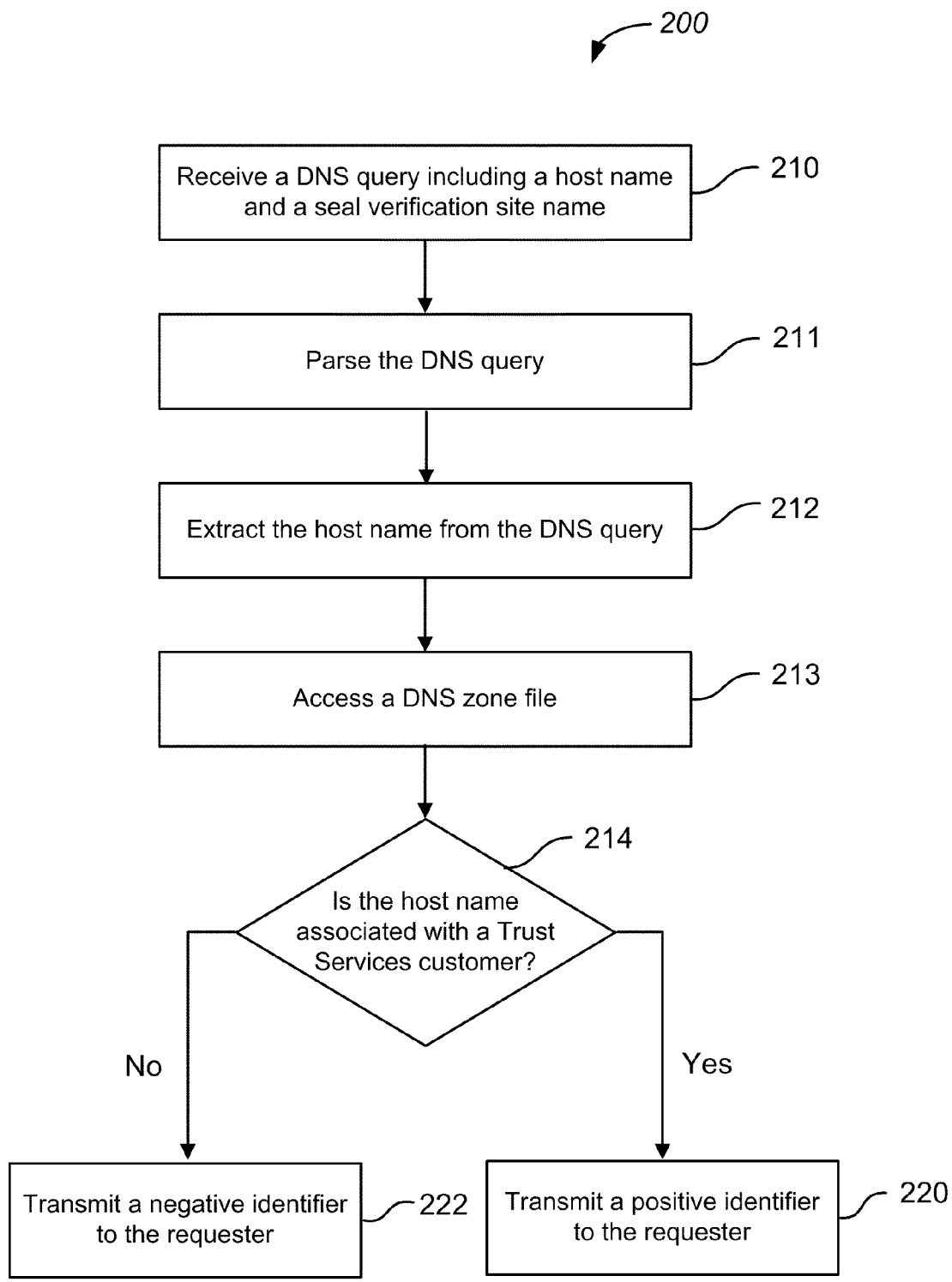
FIG. 2 is a simplified flowchart illustrating a method of operating a security seal server according to an embodiment of the present invention.

FIG. 2 is a simplified flowchart illustrating a method of operating a security seal server according to an embodiment of the present invention. The method 200 can include receiving a DNS query from a requester (210). In some implementations, the requester is a client or an add-on running on a browser. The DNS query, also referred to as a DNS address query, can include a host name and a seal verification site name. For example, if the host name is www.schwab.com and the seal verification site name is seal.verisignlabs.com, then the DNS query could be www.schwab.com.seal.verisignlabs.com. In this example, the host name, including the top-level domain (i.e., com) and both subdomains (i.e., schwab and www) are concatenated with the seal verification site name to form the DNS query. In other embodiments, only the first subdomain could be included in the DNS query. Typically, the suffix appended to the host name is a subdomain of the provider of the SSL certificates, in this example, a subdomain of verisignlabs.com.

In order to provide web site verification information, the browser or a client running on the browser, can provide the web site name, referred to as a host name, to one or more providers of SSL certificates or other Trust Services. Because customer lists are typically considered to be proprietary information of the Trust Services provider, the browser or client submits the host name and then the process of comparing the submitted names against customer names is performed by the Trust Services provider. As an example, one or more host names are transmitted to a server controlled by VeriSign (e.g., a server at seal.verisignlabs.com) so that the one or more host names can be compared against a list of valid VeriSign certificate customers. Look-up requests can also be sent to other Trust Services providers as well. A benefit provided by embodiments of the present invention is that DNS queries are typically faster than database queries and leverage the caching that is currently implemented in the resolver libraries, enabling the client to access results with a high efficiency. In an embodiment, the client can implement a batch mode in which multiple requests are sent using a suitable protocol.

The method also can include parsing the DNS query (211) and extracting the host name (212). For the example given above, the host name www.schwab.com could be extracted from the DNS query. In an embodiment, the DNS subdomain (e.g., seal.verisignlabs.com) is configured with a DNS zone file generated from a Trust Services provider database 130 containing the Trust Services (e.g., certificate) client list. The DNS zone file is stored in a memory 116 accessible to a data processor 112 performing one or more of the functions described herein. Thus, the SSL certificate customer list stored in the Trust Services provider database 130 is converted into a DNS zone file in this embodiment. At regular intervals, the DNS zone file is regenerated and the DNS server software can reload the updated file. As illustrated in FIG. 1, the processor 132 can pull a customer list from Trust Services provider database 130 and transmit a portion of the customer list to data processor 112 for storage in memory 116. The DNS zone file is accessed (213) and the DNS query is then compared to the DNS zone file, which can provide information on all of the Trust Services provider's customers. The DNS server software can be configured to deny zone file transfer requests to avoid revealing the entire client list via unauthorized DNS requests.

A determination can then be made of whether the host name is associated with a customer who has purchased one or more security services (e.g., a current SSL certificate) from the Trust Services provider (214). If the host name is associated with a Trust Services customer, for example, if the web site has a valid SSL certificate from the Trust Services provider, then a positive identifier is transmitted to the requester (220). In one embodiment, in response to the DNS query, the address returned for host names associated with customers (i.e., positive look-ups) is of the form 127.0.0.x, where x is any odd number from 1 to 253. Addresses of this type are non-routable to avoid confusion. In a particular implementation, the HTTP status code is set to 200 (OK) in response to a positive lookup.

The least significant byte in the address (i.e., x) can be used to convey additional information to the requester. As an example, it can be used to communication information associated with the type of seal the web site is authorized to display. Thus, for certificates of varying security, different seal graphics could be displayed for each of the certificate types, communicating additional information to the user. The type of certificate possessed by the customer could be indicated in this least significant byte, resulting in different seals being displayed. As another example, if a customer is participating in an A/B split testing program, information related to the two groups could be communicated using the least significant byte. An A/B testing program can test the effect of displaying seals. A seal associated with a link can be displayed to one user and not to another. The subsequent behavior of the users is tracked and can be compiled into statistics. The tracking statistics can be used to measure, for example, how much more or less likely a user may be to click on a link with a seal, compared to a link without a seal. In an embodiment of the invention, the customer is in an A/B test, and the information in the least significant byte is used to determine whether or not a seal is displayed, thereby enabling tracking of the display and clicking of the link, but disabling the randomized display of the seal. Merely by example, x=7 could be used to communicate that the customer is in an A/B test and the seal should be displayed and x=9 could be used to communicate that the customer is in an A/B test and the seal should not be displayed. Thus, various types of additional information can be communicated using the least significant byte or other portions of the returned address. In summary, the least significant byte can provide an opportunity to add more features and more sophisticated behavior to the clients. One of ordinary skill in the art would recognize many variations, modifications, and alternatives.

Examples of the use of the least significant byte to communication information related to the certificate type and participation in an A/B split testing program include:
 ||SSL Certificate and participating in NB split testing||127.0.0.5||bit 0 and bit 2 are set||
 ||EV SSL Certificate and participating in NB split testing||127.0.0.7||bit 0, bit 1 and bit 2 are set||
 ||Malware free and participating in NB split testing||127.0.0.9||bit 0 and bit 3 are set||

||SSL Certificate, Malware free and participating in NB split testing||127.0.0.11||bit 0, bit 1 and bit 3 are set||
||SSL Certificate but NOT participating in NB split testing||127.0.0.1||only bit 0 is set||
||EV SSL Certificate but NOT participating in NB split testing||127.0.0.3||bit 0 and bit 1 are set||

These examples are not intended to limit the scope of the present invention, but only to illustrate the range of options available using embodiments of the present invention. In addition to these examples related to digital certificates, other embodiments relate to other Trust Services including verifying that a web site is free of malware, has security vulnerabilities, or the like. In order to detect a problem with a web site (such as phishing, the presence of malware, etc.), the scanning technology developed and/or performed either by the Trust Services provider or by a third party can be utilized. Additionally, data sets available from other sources, including blacklists that indicate a high risk web site, may be used to perform scanning and/or to provide inputs for decisions to display/not display a security seal, as may whitelists and graylists.

If the host name is not associated with a Trust Services customer, a negative identifier can be transmitted to the requester (222). In one embodiment, in response to the DNS query, an address of 127.0.0.0 is returned, with the least significant byte communicating the fact that the web site does not possess a valid certificate or other verification from the Trust Services provider. Other responses including a null response could also be utilized to indicate the lack of a valid certificate or lack of other Trust Services. As an example, a 404 (not found) HTTP status code could be returned to the client.

Embodiments of the present invention provide numerous benefits by leveraging the DNS infrastructure to utilize a DNS look-up approach to provide web site verification information. These benefits include lightweight client code and minimal loading on the networks and servers of the Trust Services providers. Since the technique leverages the DNS resolver built into every operating system, the client code utilized to perform the methods described herein is small. As will be evident to one of skill in the art, DNS is a distributed system and loads on DNS resolvers are reduced by caching across the DNS network. In order to reduce update latency, the DNS record time-to-live may be configured to reduce the latency at the expense of increased loading. The DNS zone files can be updated on a periodic basis, for example, every two hours, in order to provide current information in response to queries. Likewise, zone file data may be cached as appropriate at the user machine, a server coupled to the user machine, etc.

It should be appreciated that the specific steps illustrated in FIG. 2 provide a particular method of operating a security seal server according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
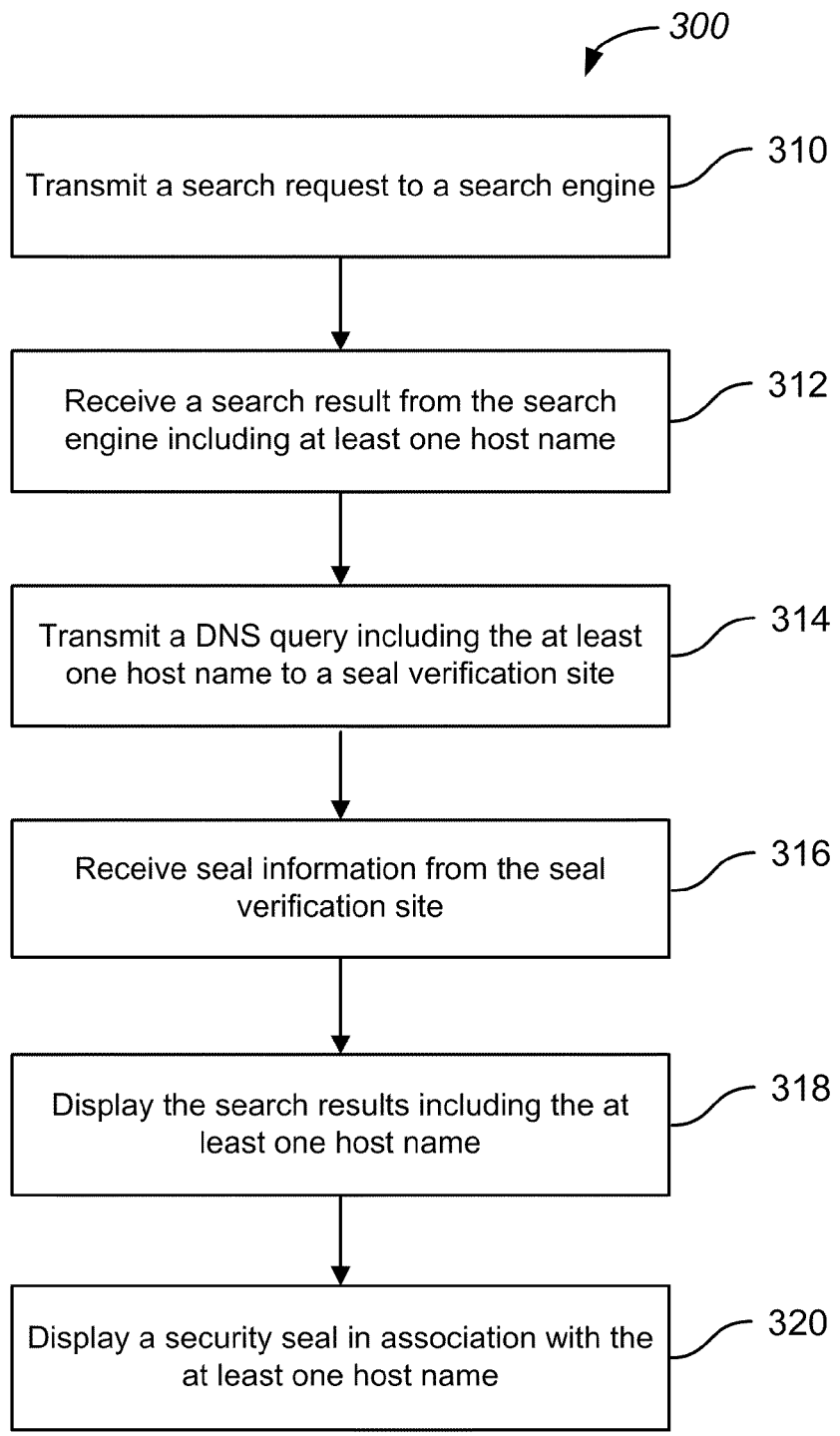
FIG. 3 is a simplified flowchart illustrating a method of displaying security seals in a web browser according to an embodiment of the present invention.

FIG. 3 is a simplified flowchart illustrating a method of displaying security seals in a web browser according to an embodiment of the present invention. The method 300 can include transmitting a search request to a search engine (310). The search result will be received from the search engine and will include one or more host names (312). Typically, multiple host names and information about the web sites that were returned by the search will be displayed on the search results web page. As an example, a search using Google will return a list of links to web sites and cursory information regarding the various web sites that are displayed. The links may include sponsored links and/or unsponsored links. According to a specific embodiment of the present invention, the web sites returned in the search results will be compared against a list of SSL certificate customers. As examples, the customer list could be a list for a single Trust Services provider or lists for multiple Trust Services providers.

The method also can include transmitting a DNS query (also referred to as a DNS look-up) to a seal verification site (314). It should be noted that although some embodiments provide the functionality of verifying that a web site has a valid digital certificate, the present invention is not limited to this particular embodiment. Therefore, customers that will have a seal displayed in association with their web site can be customers of other Trust Services including scanning for malware, security vulnerabilities, or the like. Thus, the category of Trust Services covers the variety of services that may be provided and verified according to embodiments of the present invention. Thus, a customer may be included in a customer list as a result of the purchase of one of several services including digital certificates. The DNS query is typically transmitted by a client (e.g., an add-on) running on the browser although the functionality discussed herein could be integrated into the browser operation. The DNS query will include a host name returned by the search and a seal verification site name. Continuing with the example discussed in relation to FIG. 2, the host name could be www.schwab.com and the seal verification site name could be seal.verisignlabs.com, resulting in a DNS query of www.schwab.com.seal.verisignlabs.com. In this example, the host name and the seal verification site name are concatenated to form the DNS query. Other protocols and/or combinations that communicate information about the web sites found in the search results and the seal verification site name can be utilized as well. DNS queries of this type can be transmitted for all the web sites that were returned in the search results.

The seal verification site will compare the host name to a list of current Trust Services customers (e.g., certificate owners) and return seal information to the requester (316). As discussed in relation to FIG. 2, the seal information could be provided as an address returned by the seal verification server that indicates that the web site has a valid certificate or been otherwise verified, as well as additional information related to the type of certificate or the like. Thus, the seal information is included in a returned address in one embodiment. Additionally, the address could indicate that no valid certificate is associated with the host name. The client interprets the returned address as needed.

The search results including the host name are displayed (318) and a security seal is displayed in association with the host name (320). Because of the quick turnaround on DNS queries, the security seals can be displayed in real-time as the search results are displayed. FIG. 4B illustrates an example of how security seals can be displayed adjacent or next to the web site links in the search results. The security seals, typically stored as .gif or .jpeg images, are provided to the client during an initialization phase or otherwise as appropriate to the particular implementation. In other embodiments, a security seal can include audio, video, animation, text, etc. For host names that are not in the list of Trust Services customers, no security seal may be displayed. Alternatively, a graphic could be displayed to indicate, for example, that the web site lacks a certificate or has inadequate protection. Thus, embodiments of the present invention provide methods and systems for providing security information associated (e.g., inline) with the search results. Thus, it is readily apparent to the user which sites have been verified by a Trust Services provider and which sites do not have such protections.

Although the method illustrated in FIG. 3 can provide Trust Services information for a single Trust Services provider, the present invention is not limited to this particular implementation. The client could transmit DNS queries to multiple Trust Services providers, thereby displaying information related to the certificates issued by or other Trust Services provided by the various providers.

It should be appreciated that the specific steps illustrated in FIG. 3 provide a particular method of displaying security seals in a web browser according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 1, a user will prepare a request through the user input device 150. Typically, this operation will be performed automatically by a client running on a browser as described above. The request will include a DNS query. The DNS query will be transmitted to the communications module 114, where it is received and them processed. The data processor 112 will parse the DNS query and extract the host name from the DNS query or a parsed version of the DNS query. Since the data processor 112 has been updating the DNS zone file stored in memory 116, typically on a regular basis, a formatted list of Trust Services (e.g., certificate) customers is available for comparison with the host name.

The processor can perform a lookup or other action in order to compare the host name to the list of Trust Services customers, which may be a filtered list. If the host name is a customer, then the processor instructs the communications module 114 to transmit a response that indicates a positive identifier so that the security seal can be displayed on the display device 152, for example, displaying the security seal to the right of the web site link associated with the host name. Positive identifiers associated with particular addresses have been discussed above. If the host name is not a customer, then the processor can instruct the communications module 114 to transmit a response that indicates a negative identifier. In this case, no security seal or a negative seal can be displayed in association with the web site link associated with the host name. The negative identifier may be a non-existent domain status message or other suitable identifier.

Thus, embodiments of the present invention are applicable to certificate providers as well as providers of other Trust Services. Utilizing embodiments of the present invention, a variety of services are provided including display of a seal in search as visual indication of the services. As an example, if a web site has been scanned for malware or other security risks and is determined to be clean, a security seal can be displayed in conjunction with the search results.

Figure 4A:
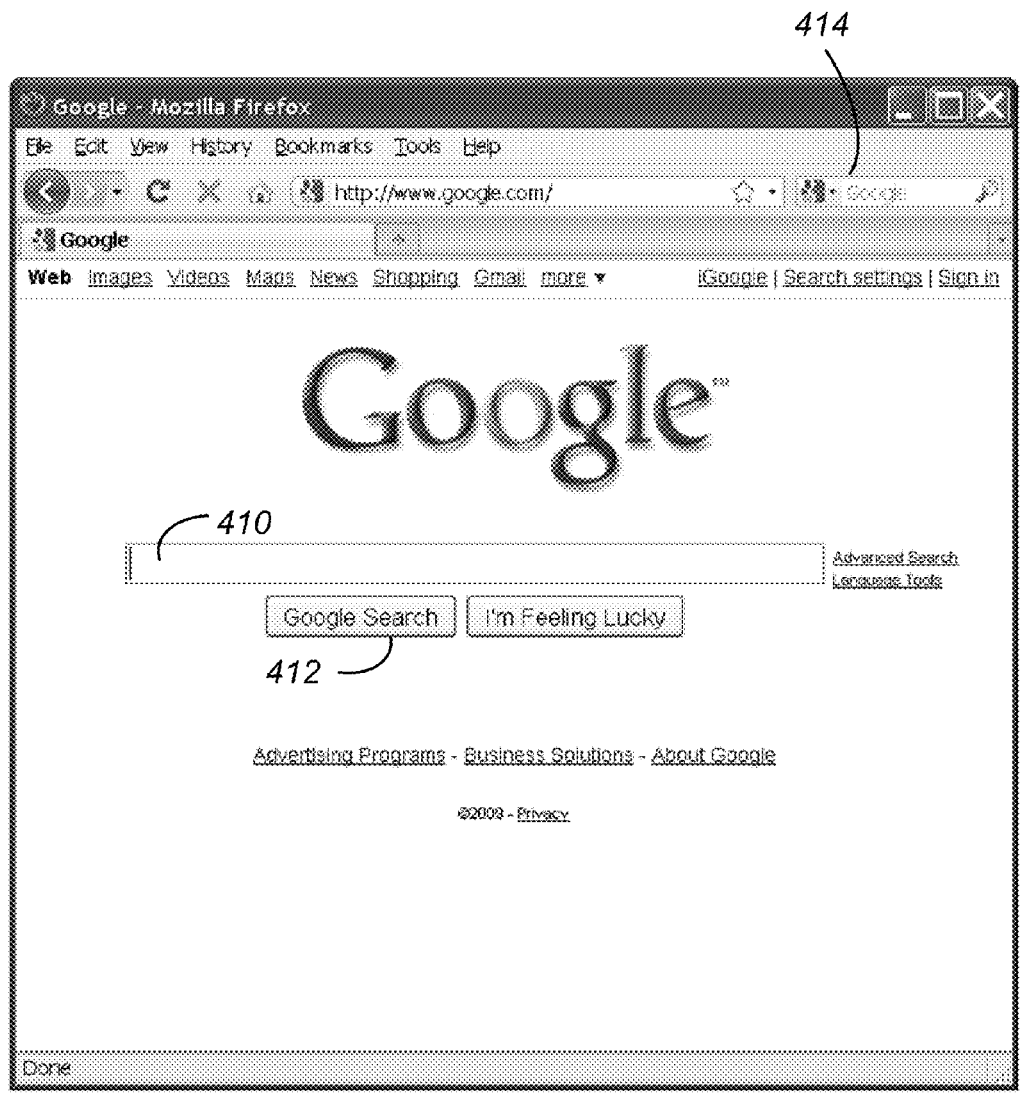
FIG. 4A is a simplified screenshot of a conventional search engine web page.
Figure 4B:
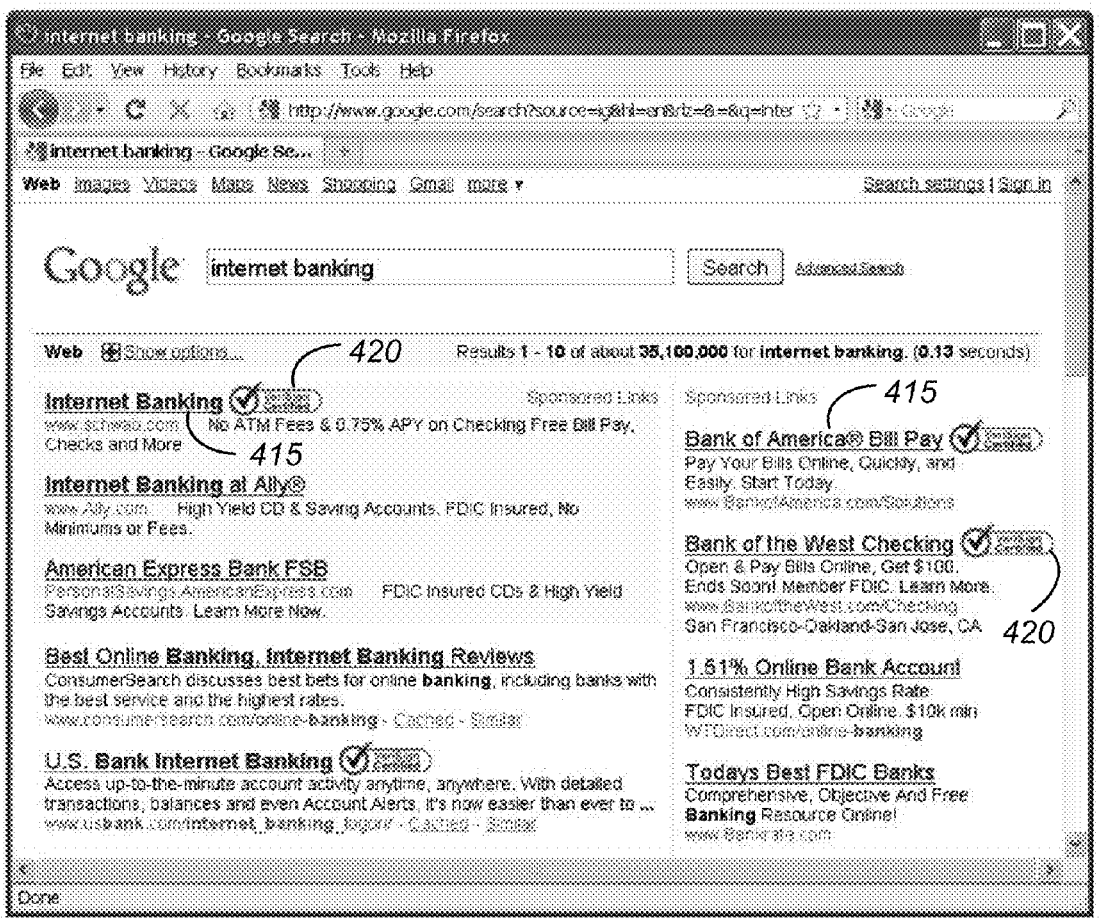
FIG. 4B is a simplified screenshot of a web page with search results and security seals according to an embodiment of the present invention.

FIG. 4A is a simplified screenshot of a conventional search engine web page. The search query is entered into the input area 410 and a search is conducted by clicking the user input button 412. Of course, other methods of initiating Internet searches can be utilized, including the Google Toolbar 414 displayed in the upper right hand corner of the browser, through a search feature on a smart phone, or the like. One of ordinary skill in the art would recognize many variations, modifications, and alternatives. After the search is initiated, the search results will be displayed as illustrated in FIG. 4B.

FIG. 4B is a simplified screenshot of a web page with search results and security seals according to an embodiment of the present invention. As illustrated in FIG. 4B, embodiments of the present invention display security seals integrated with the search results. As an example, graphical elements 420, for example, the VeriSign Secured® Seal, are inserted adjacent to web site links 415 to indicate that the particular web site has a valid SSL certificate issued by the Trust Services provider. In the embodiment illustrated in FIG. 4B, web sites that have been verified and issued an SSL certificate by VeriSign are identified by the VeriSign Secured® Seal. Thus, as the search results are presented to the user, web site verification information is also presented to the user so that that the user's confidence in the secure websites is increased.

Referring to FIG. 4B, in response to the search for "internet banking," www.schwab.com is listed in the search results, along with the VeriSign Secured® Seal. www.Ally.com and PersonalSavings.AmericanExpress.com do not have a graphical element 420, indicating that these web sites do not have a valid SSL certificate issued by VeriSign. In the sponsored links column, the www.BankofAmerica.com/Solutions and www.BankoftheWest.com/Checking web sites are also indicated as a valid customer for a VeriSign SSL certificate. Thus, using embodiments of the present invention, seals can be inserted into search results or other internet pages to indicate web pages with valid certificates or other Trust Services.

Figure 4C:
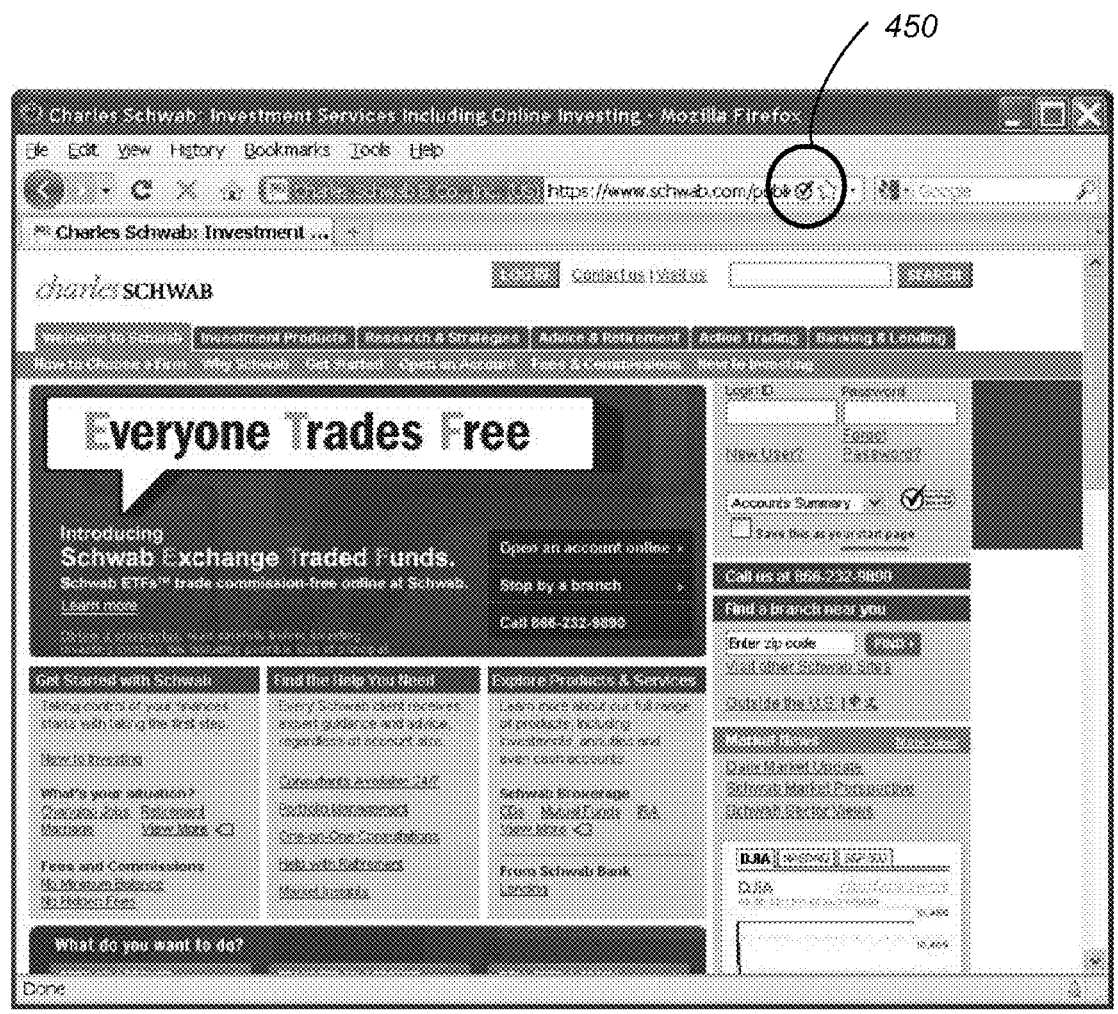
FIG. 4C is a simplified screenshot of a web page with a security seal according to an embodiment of the present invention.

FIG. 4C is a simplified screenshot of a web page with a security seal according to an embodiment of the present invention. As illustrated in FIG. 4C, the address line of the browser can include a security seal 450 displayed after the web site address. When the web site is loaded, a client, for example, an add-on running on the browser or the browser itself, transmits a DNS query to a seal verification server as discussed in relation to FIGS. 2 and 3. In response, the seal verification server responds with an address indicating whether or not the web site possesses a valid certificate. The client or browser parses the address and extracts seal verification information that initiates a display of the security seal 450 in the address line. The security seal could be displayed in other locations on the web page as appropriate to the particular application.

FIG. 5 is a screenshot of DNS look-ups performed using a command line tool according to an embodiment of the present invention. As illustrated in FIG. 5, a command of "nslookup www.schwab.com.seal.verisignlabs.com" resulted in a response of Address: 127.0.0.1. This response indicates that www.schwab.com has been found in the list of Trust Services customers for which the seal should be displayed. A command of "nslookup www.ally.com.seal.verisignlabs.com" resulted in a response of Address: 67.215.65.132. This response indicates that www.ally.com has not been found. Thus, FIG. 5 is an example of behavior related to the present invention. If the host name is in the list maintained by the Trust Services provider, the client receives an address that it can than exploit to perform certain actions, for example, displaying the security seal. If the host name is not in the list, a non authoritative answer can be returned and the client does not display a security seal, can display a specific message, or the like.

In the method described in relation to FIG. 2, a DNS look-up was utilized to obtain information regarding a host name's security (e.g., certificate) status. Alternatively, security status information could be obtained using an API running over HTTP(S). As an example, the client could transmit a request for security information using an HTTP(S) request. The seal verification server could receive this HTTP(S) request and then convert it into a DNS look-up and use the mechanisms described above to determine if the host name is associated with a Trust Services customer. Alternative methods of responding to an HTTP(S) request could also be utilized. Because DNS responses may be "spoofed" by attacks on DNS servers operating between the client and the seal verification server, some embodiments utilize an alternative or complementary look-up mechanism using a secure HTTPS connection that is used to verify affirmative responses and eliminate false-positive seal data. In some embodiments, the HTTPS queries rely on standard web API techniques.

Therefore, both DNS look-ups and HTTP(S) requests are included within the scope of the present invention. The response times for DNS look-ups are typically 20-30 times faster than the responses for HTTP(S) requests, enabling the search results with seals to be displayed more quickly in some DNS look-up implementations in comparison to other protocols.

DNS security extensions (DNSSEC) are currently being standardized and implemented. The implementation of DNS-SEC will provide a mechanism for obtaining seal verification information using a secure connection. It is possible that the added security provided by DNSSEC, enabling the seal verification server to be queried over a trusted network, will be used in place of alternative or complementary look-ups using HTTPS protocols. Thus, embodiments of the present invention can utilize DNSSEC look-ups in addition to the DNS look-ups described herein. One of ordinary skill in the art would recognize many variations, modifications, and alternatives.

A search result which is displayed along with a seal may also incorporate other features to ensure that the user is taken to the correct website. There are a number of ways by which a user's machine may be compromised such that a request to resolve a domain name will render an erroneous result. For example, a website may be hosted on a computer with the IP address 123.123.123.123. A computer virus or other malicious code may, for example, modify the "lmhosts" or "hosts" files such that results from a DNS server will be ignored for certain domains, and the www.verisign.com domain may therefore resolve to 23.23.23.23 instead, which may be the address of a computer controlled by a phisher or some other person attempting to illegally collect credit card numbers or other sensitive user data.

When a user clicks a link in a search result, the user's web browser will navigate to the URL in the search result. This URL may contain a domain name of a server to which the user is to send a request. The user's web browser will look up an IP address for the domain name using its local DNS resolution mechanism and send the request to the computer at that address. If the user's computer has been compromised in some way (e.g. if its cache of DNS addresses has been poisoned), the DNS query may result in an IP address which does not correspond to the legitimate host for that domain name. In this case, the user's browser will be redirected to this host, and may potentially supply sensitive information to it. In an embodiment of the invention, additional code can be executed before the browser is directed to the URL to ensure that the domain name will resolve correctly. This code may look up an IP address for the domain name using the local computer's DNS resolution mechanism and compare the result with that provided by a third-party, such as VeriSign. If the IP addresses match, the script may redirect the user's browser to the target website, and if they do not, the script may warn the user that their computer has been compromised and offer them a number of options to rectify the problem. These solutions may include installing anti-virus software, updating software already on the user's computer and accessing the URL using a proxy server.

To determine the effect of placing the seal in the search result, in an embodiment of the invention, the seal may be displayed to some users and not to others. Subsequent behavior of the users (e.g., links selected by the user, related data, etc.) can be tracked and correlated to whether a seal was displayed or not. In this way it is possible to determine the number of times the result was displayed without the seal, the number of times the result was displayed with the seal, click-through numbers for the respective displays, etc.

As described above, when determining whether to display a seal for a result from "www.amazon.com", a DNS query may be sent to "www.amazon.com.seal.verisignlabs.com", and if the IP address "127.0.0.1" is returned, the seal may be displayed. In an embodiment of the invention, if a different IP address is returned, e.g. "127.0.0.2", the client will determine randomly whether to display a seal or not. In an embodiment of the invention, the chance of displaying a seal will be set to 50% and the chance of not displaying a seal will be set to 50%. This probability can be determined on a per-computer basis, on a per-seal basis or otherwise. In the former, the same computer will display all seals subject to such testing or none of them. In the latter case, whether to display each seal will be determined individually.

In one embodiment of the invention, there is a single IP address that can be returned that will indicate that the domain name should be subject to seal testing. In another embodiment of the invention, there may be a number of different IP addresses used. An IP address contains 32 bits of data, and some of these bits can be used to convey information about the testing. In one embodiment of the invention, the last 8 bits of the address can be used to determine the probability of displaying the seal. In another embodiment, the same bits may identify a particular group of users for testing, such that all users not in the group see the seal, and all users in the group are subject to testing. These two examples do not limit the scope of the use of the IP address to carry information about the seal testing, and a person skilled in the art will be able to control the testing using a number of factors specified in this IP address.

When only subjecting a particular group to testing, the group may be determined by geographic location, the language of the browser, or any other single factor or combination of factors. Some such factors may be determined on the client-side using a script. For example, a particular implementation may specify 256 groups which can then be referenced uniquely by 8 bits from the IP address. Of these, a number may refer to groups defined by the language of the browser, a number may refer to groups defined by capabilities of the client-computer, and a number may refer to geographic location.

When determining whether to display or not to display a seal in a test, a pseudo-random number generator may be used to generate a number between 0 and 1, and the seal may be displayed if this number is greater than the predetermined likelihood of displaying the seal. This generator may be seeded using the local clock on the computer on which the seal is being displayed; in this case, whether to display the seal or not will be determined at the time of rendering of each search result. In another embodiment of the invention, the random number generator may be seeded using a unique ID for the particular computer, and in this case, the same computer will display or not display all the seals subject to testing. A person of skill in the art will understand that there are a number of other ways, not including a random number generator, to determine whether to display the seal, either based on a computer unique id or otherwise that are within the scope of this invention.

A unique id for a particular computer may be established using a cookie. Where cookies are not available, it may be possible to establish a unique id based on properties of the browser and host computer available from the scripting engine, including: the version of the operating system, the version of the browser, the language of the browser, the supported language encodings of the browser, the time-zone of the computer, the resolution of the screen, the list of installed fonts, the list of installed plug-ins, the HTTP Accept headers, etc. This unique id may be used to track a particular user over time.

The code implementing the seal may detect when the search result is displayed and when it is clicked. As the script knows whether the seal was displayed or not, it will be able to determine whether a result clicked displays a seal or not. In an embodiment of the invention, the results are submitted live to a server compiling the statistics. For example, a message is sent from the client to the server every time a search result is displayed and every time a search result is clicked. In another embodiment the results are compiled on the client-computer and sent to the server at an interval, e.g. every two hours. The results may be stored in the user's browser using cookies or DOM local storage as they are compiled, and may be fetched from the same place before submission to the server. In yet another embodiment, the client computer analyzes and summarizes the results and transmits them to a server.

The script that displays the search results may be configured to verify the last time results were submitted every time it determines whether to display a seal, and if the interval between submissions has been exceeded, a results submission will be triggered. The results may be submitted to a server for compiling statistics over HTTPS.

After compiling the statistics from the various users observing and clicking the search result, data and statistics can be generated to show (a) the number of times the results was displayed without a seal, (b) the number of times the results was displayed with a seal, (c) the number of times the result was clicked when displayed without a seal, (d) the number of times the result was clicked when displayed with a seal, etc. Using this information it is possible to calculate a click-through ratio for results displayed with a seal, and results displayed without a seal. A higher click through rate for results displayed with a seal may indicate that there is a relationship between the displaying of the seal and the click-through rate. In an embodiment of the invention, a statistical test for independence can be used to verify that the collected data set is sufficient to draw such a conclusion, and whether it is correct. These tests can include the $\chi^2$ test, Fisher's exact test and any other suitable statistical test.

In an embodiment of the invention these results are implemented in real-time to determine whether to display the seal or not. For instance, it may be determined that for users in a particular country, displaying the seal causes a reduced click-through rate, and the seal may accordingly be disabled for users in this country. Testing may be conducted automatically for certain groups at intervals to determine changes in behavior and whether to change the display of the seal to a particular group. Likewise, embodiments of the present invention can be used to assess the popularity of various seal formats, seal data, etc.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of testing the efficacy of a seal, including:
   receiving a request that includes a domain;
   determining that the domain is subject to testing;
   responding to the request by sending a value that the domain is subject to a determination of click-through ratios based on a presence of a security seal displayed with a link representative of the domain;
   receiving information based upon the number of times the link was displayed with the security seal and the number of times the link was displayed without the security seal and upon the number of times the link was selected when the security seal was displayed and the number of times the link was selected when the security seal was not displayed;
   determining a first click-through ratio based upon the number of times the link is clicked on and displayed with the security seal, and a second click-through ratio based upon the number of times the link is clicked on and displayed without the security seal;
   based upon the information received, determining that the number of times the link was clicked is statistically dependent on the number of times the link was displayed with the security seal and
   upon the number of times the link was displayed without the security seal.

2. The method of claim 1, wherein receiving a request that includes a domain includes receiving a DNS request that includes the domain.

3. The method of claim 2, wherein the DNS request includes a request to resolve a fully qualified domain name that contains the domain as a substring.

4. The method of claim 2, wherein responding to the request by sending a value that the domain is subject to testing includes responding to the DNS request by sending an IP address indicating that the domain is subject to testing.

5. A method of testing the efficacy of a seal, including:
   sending a request that includes a domain;
   receiving a response that indicates that the domain is subject to a determination of click-through ratios based on a presence of a security seal displayed with a link representative of the domain;
   randomly determining whether to display the security seal in conjunction with the link containing the domain;
   displaying the link;
   recording a first click-through ratio based upon whether the security seal was displayed with the link and whether the link was selected, and a second click-through ratio based upon whether the security seal was not displayed with the link and whether the link was selected;
   sending information based upon the number of times the link was displayed with the security seal and the number of times the link was displayed without the security seal and upon the number of times the link was selected when the security seal was displayed and the number of times the link was selected when the security seal was not displayed; and based upon the information received, determining that the number of times the link was clicked is statistically dependent on the number of times the link was displayed with the security seal and upon the number of times the link was displayed without the security seal.

6. The method of claim 5 wherein sending information comprises sending information about a single display of a link.

7. The method of claim 5 wherein sending information comprises sending information about a plurality of displays of a link.

8. The method of claim 7 wherein sending information comprises determining that the time passed since the last time information was sent has exceeded a threshold and sending information about one or more links displayed since the last time information was sent.

9. The method of claim 5 wherein randomly determining whether to display a seal in conjunction with a link comprises generating a value based upon the current time and using it to determine whether to display the security seal.

10. The method of claim 5 wherein randomly determining whether to display a security seal in conjunction with a link comprises generating a value based upon characteristics of the user's browser and using it to determine whether to display the security seal.

11. The method of claim 10 wherein generating a value based upon characteristics of the user's browser comprises generating the value such that the same value is generated each time the user's browser generates the value.

12. The method of claim 5 wherein randomly determining whether to display a security seal in conjunction with a link comprises using a probability distribution function.

\* \* \* \* \*